United States Patent Office 3,483,164
Patented Dec. 9, 1969

---

3,483,164
TRISPHENOLS AND EPOXIDE RESINS PREPARED THEREFROM
Oliver A. Barton, Florham Park, William D. Griffin, Morris Township, Morris County, Richard B. Lund, Whippany, and John Vitrone, Morristown, N.J., and Zalik Oser, Falls Church, Va., assignors to Allied Chemical Corporation, New York, N.Y., a corporation of New York
No Drawing. Application Aug. 26, 1964, Ser. No. 392,291, which is a continuation-in-part of application Ser. No. 323,067, Nov. 12, 1963. Divided and this application Oct. 21, 1965, Ser. No. 510,431
The portion of the term of the patent subsequent to Mar. 14, 1984, has been disclaimed
Int. Cl. C08g 30/04
U.S. Cl. 260—47
9 Claims

---

ABSTRACT OF THE DISCLOSURE

Novel epoxide resins are prepared by reaction of alkyl-substituted $\alpha$, $\alpha'$,$\alpha''$-tris(hydroxyphenyl)-1,3,5- $C_1$ to $C_3$ trialkylbenzenes with epichlorohydrin. These epoxide resins may be readily cured to afford hard, infusible, cured resins possessing excellent chemical and mechanical properties.

---

This is a division of application Ser. No. 392,291, filed Aug. 26, 1964 and now abandoned. This invention relates to new trisphenols and expoxide resins derived therefrom and, more particularly to new $\alpha$, $\alpha'$, $\alpha''$-tris(hydroxyphenyl)-1,3,5-trialkylbenzenes, their corresponding epoxide resins and processes for their preparation. This application is a division of Ser. No. 392,291, now abandoned, which is in turn a continuation-in-part of our co-pending U.S. application Ser. No. 323,067 filed Nov. 12, 1963 now U.S. Patent 3,309,339.

Trisphenols have long been recognized, in addition to their inherent antiseptic properties, as useful intermediates in the preparation of more complex organic structures. For example, epoxide resins are readily prepared by reacting trisphenols with epichlorohydrin. It has been found and surprisingly so, that epoxide resins prepared from $\alpha$, $\alpha'$, $\alpha''$-tris(hydroxyphenyl)-1,3,5-trialkylbenzenes exhibit low shrinkage, extraordinary hardness, ability to wet and to adhere to a variety of materials, chemical inertness and outstanding mechanical strength.

Epoxide resins derived from the subject trisphenols of the present invention exhibit particularly outstanding physical and chemical properties when cured to thermoset condition.

Accordingly, it is an object of the present invention to provide new $\alpha$, $\alpha'$, $\alpha''$-tris(hydroxyphenyl)-1,3,5- trialkylbenzenes.

It is a further object of the present invention to provide new $\alpha$, $\alpha'$, $\alpha''$-tris(hydroxyphenyl)-1,3,5-trialkylbenzene epoxide resins.

A further object is to provide a process for preparing $a$, $\alpha'$, $\alpha''$-tris(hydroxyphenyl)-1,3,5-trialkylbenzenes in high yield.

Still a further object is to provide a process for preparing $\alpha$, $\alpha'$, $\alpha''$-tris(hydroxyphenyl)-1,3,5-trialkylbenzene epoxide resins in high yield. Other objects and advantages will be apparent from the following description.

The $\alpha$, $\alpha'$, $\alpha''$-tris(hydroxyphenyl)-1,3,5-trialkylbenzenes of the present invention may be represented by the following formula:

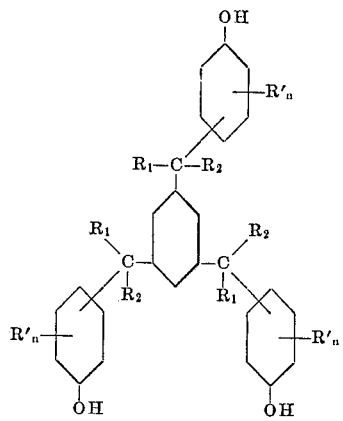

wherein $R_1$ and $R_2$ are the same or different and are selected from the group consisting of hydrogen and alkyl radicals having 1 to 2 carbon atoms, R' is selected from the group consisting of chlorine and alkyl radicals having 1 to 5 carbon atoms and $n$ is an integer from 0 to 2.

$\alpha$, $\alpha'$, $\alpha''$-Tris(hydroxyphenyl)-1,3,5-trialkylbenzenes may be prepared by admixing a 1,3,5-tri-substituted benzene compound selected from the group consisting of 1,3,5-trialkenylbenzenes represented by the formula:

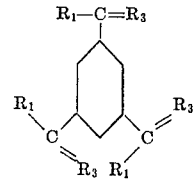

wherein $R_1$ is selected from the group consisting of hydrogen and alkyl radicals having 1 to 2 carbon atoms and $R_3$ is selected from the group consisting of $CH_2$ and $CH-CH_3$ radicals and $\alpha$, $\alpha'$, $\alpha''$-trihydroxy-1,3,5-trialkylbenzenes represented by the formula:

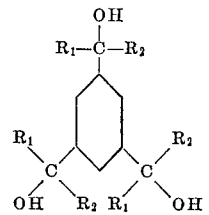

wherein $R_1$ and $R_2$ are the same or different and are selected from the group consisting of hydrogen and alkyl radicals having 1 to 2 carbon atoms, with a phenolic compound of the formula:

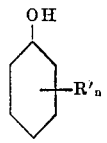

wherein R′ is an alkyl radical having 1 to 5 carbon atoms and n is an integer from 0 to 2, in a mol ratio of at least about 3 mols phenolic compound per mol of 1,3,5-trisubstituted benzene compound, at temperature of from the melting point to the boiling point of the reaction mixture, in the presence of an acidic condensation catalyst, and thereafter recovering the resulting α, α′, α″-tris(hydroxyphenyl)-1,3,5-trialkylbenzene from the reaction mixture.

Suitable trialkenybenzene reactants are illustrated by the following compounds.

1,3,5-trivinylbenzene
1,3,5-tris(isopropenyl)benzene
1,3,5-tris(2-sec. butenyl)benzene Examples of suitable tris(α-hydroxyalkyl)benzenes are:
α, α′, α″-trihydroxy-1,3,5-triethylbenzene
α, α′, α″-trihydroxy-1,3,5-triisopropylbenzene
α, α′, α″-trihydroxy-1,3,5-trisec.-butylbenzene
α, α′, α″-trihydroxy-1-methyl-3,5-diethylbenzene
α, α′, α″-trihydroxy-1-methyl-3-ethyl-5-isopropylbenzene
α, α′, α″-trihydroxy-1-ethyl-3,5-diisopropylbenzene Illustrative phenolic reactants are:
phenol
o-cresol
m-cresol
p-cresol
2,6-dimethylphenol
3-ethylphenol
4-ethylphenol
2-pentylphenol
2,4-diethylphenol
2,3-diethylphenol
2-methyl-6-isopropylphenol
2-ethyl-6-methylphenol
2-isopropyl-4-methylphenol
2-isopropyl-3-ethylphenol
2,5-diisopropylphenol
2-isopropyl-3-tert.-butylphenol
2-sec.-butyl-4-methylphenol
2-sec.-butyl-6-ethylphenol
2-tert.-butyl-4-methylphenol
2-tert.-butyl-6-ethylphenol
2-tert.-butyl-3-n-butylphenol and the like.

The reaction employing a trialkenylbenzene reactant with a phenolic reactant may be illustrated by the equation:

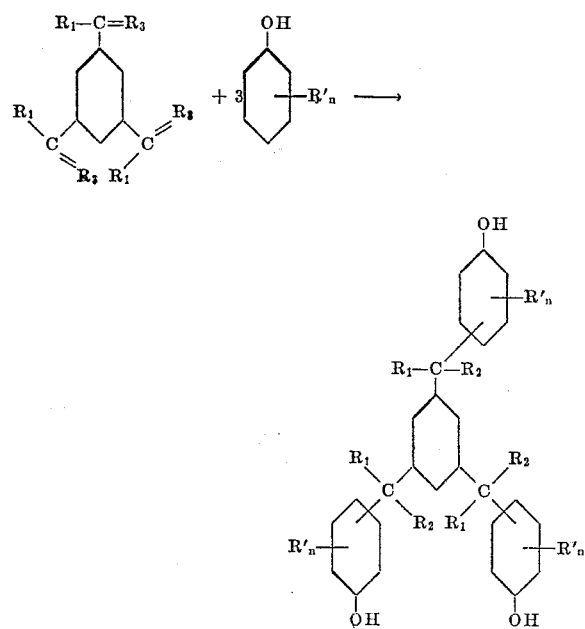

wherein $R_1$ is selected from the group consisting of hydrogen and alkyl radicals having from 1 to 2 carbon atoms, $R_2$ is an alkyl radical having 1 to 2 carbon atoms, R′ is an alkyl radical having 1 to 5 carbon atoms, n is an integer from 0 to 2 and $R_3$ is selected from the group consiting of $CH_2$ and CH—$CH_3$ radicals.

The reaction employing a tris(α-hydroxyalkyl)benzene reactant with a phenolic reactant may be illustrated by the equation:

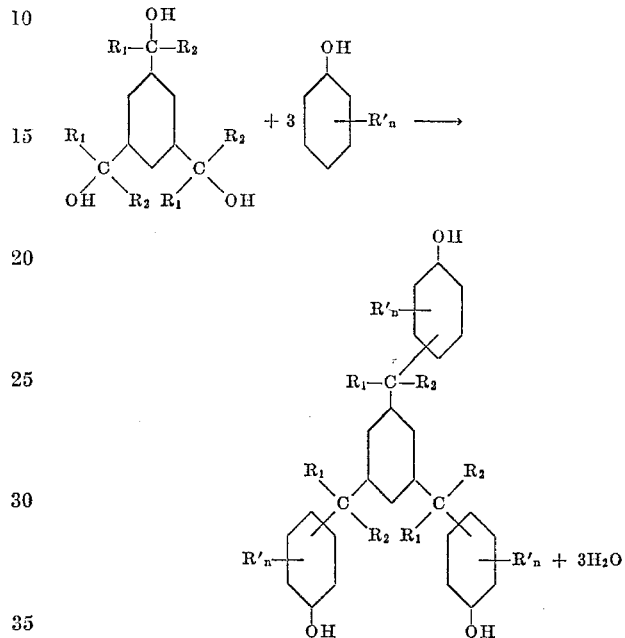

wherein $R_1$ and $R_2$ are the same or different and are selected from the group consisting of hydrogen and alkyl radicals having from 1 to 2 carbon atoms, R′ is an alkyl radical having 1 to 5 carbon atoms and n is an integer from 0 to 2.

The reaction product of the above-illustrated phenolic compounds with the trialkenylbenzene or tris(α-hydroxyalkyl)benzene compounds is comprised of symmetrical and non-symmetrical isomeric forms of α,α′,α″-tris(hydroxyphenyl)-1,3,5-trialkylbenzenes. For example, the linkages of the alpha carbons to the phenolic nuclei are ortho, meta and para to the hydroxy group. It has been found, however, that the reaction product is generally comprised of an isomeric mixture of α,α′,α″-tris(hydroxyphenyl)-1,3,5-trialkylbenzenes wherein the alpha carbons are attached to the phenolic nuclei in positions predominantly ortho or predominantly para to the hydroxy groups or a mixture of more equal proportions of the two isomeric forms, and may be controlled by choice of phenolic reactant. For example, reaction with phenol or meta-substituted phenols produces a reaction product comprised predominantly of the para and ortho isomers of α,α′,α″-tris(hydroxyphenyl)-1,3,5-trialkylbenzenes. By employing a phenolic reactant having a substituent on the para position to the hydroxy group, a reaction product comprised predominantly of ortho isomer is produced. On the other hand, by utilizing a phenolic compound having an ortho substituent a product comprised predominantly of para isomer is produced. It has been found, however, that employment of a trisubstituted phenolic reactant having complete ortho and para substitution with a trisubsituted benzene reacant results in little or no reaction.

The reaction product comprised of mixtures of the isomers have been found eminently suitable in the production of epoxide resins without the need of expensive purification or isolation procedures. More specifically, the epoxide resins produced by epoxidation of the isomeric reaction mixture have not only been found to possess outstanding chemical and mechanical properties but also, in some instances, exhibit superior chemical stability as compared to the epoxide resins produced from the purified para isomer of α,α',α''-tris(hydroxyphenyl)-1,3,5-trialkylbenzene. The production of epoxide resins from the isomeric mixtures of α,α',α''-tris(hydroxyphenyl)-1,3,5-trialkylbenzene obviously possesses the inherent advantage of economical operation since it is not necessary to purify the isomeric mixtures in order to produce a resin having outstanding chemical and mechanical properties.

The molar ratio of the phenolic reactant to the benzene reactant may vary over a wide range. While the amount of about 3 mols phenolic reactant per mol benzene reactant is considered minimum, it is preferred to have an excess of phenolic reactant as high as 50:1. In preferred operation, however, molar ratios of from about 8 to 25 mols phenolic reactant per mol of benzene reactant are utilized.

For improved yields the reaction may be promoted by the use of an acidic condensation catalyst. Suitable catalysts include strong mineral acids such as hydrochloric, hydrobromic, hydrofluoric, sulfuric and phosphoric acids; Friedel-Crafts catalysts such as the halides of boron, aluminum and zinc; acid-activated clays, preferably of the silica-alumina bentonite type; and acidic type ion exchange resins. If a mineral acid catalyst is employed, it may be used either as an aqueous solution or as an anhydrous gas. The amount of mineral acid catalyst employed may vary over a wide range with good results being obtained using from about 0.1 to 10 mols per mol of benzene reactant. When an acid-activated clay or an acidic type ion exchange resin is used as catalyst, the amount employed is usually about from 5 to 40 percent by weight based upon the amount of the reaction mixture. The Friedel-Crafts catalysts are utilized in an amount of about at least one mol catalyst per mol phenolic compound charged.

In preferred operation, the catalyst is selected from the strong acid group and is employed as an aqueous solution or, more preferably, as an anhydrous gas in an amount sufficient to saturate the reaction mixture.

The reaction temperature may vary from about the melting point to about the boiling point of the reaction mixture. Such temperatures usually fall in the range of from about 40° to about 200° C. If a suitable solvent be utilized reaction temperatures as low as about 25° C. may be employed. In preferred operation, reaction temperatures in the range of about 40° to 90° C. are employed.

In order to secure a homogeneous reaction mixture and/or employ lower reaction temperature a solvent may be employed provided it is inert under the conditions of reaction, be a solvent for the reactants employed and allow for elevated temperature if desired. Suitable solvents include cyclohexane, halogenated hydrocarbons such as ethylene chloride and methylene chloride and also aromatic solvents which may contain alkyl or halogen substituents such as toluene and chloro-benzene.

Through experimentation, it has been found that reaction time is not critical. Dependent upon the nature of the reactants, type of catalyst, reaction temperatures and solvent employed, reaction times of about 0.1 to 48 hours are employed. In preferred operation, substantial yields have been secured wherein a reaction time of about 0.5 to 25 hours is employed.

The resulting isomeric mixture of α, α', α''-tris(hydroxyphenyl)-1,3,5-trialkylbenzenes may be recovered by removing excess phenolic compound by aqueous extraction. The para isomer can be obtained by recrystallization of the crude α, α', α''-tris(hydroxyphenyl)-1,3,5-trialkylbenzenes from a suitable solvent such as toluene. When hydrogen chloride is used as catalyst, an isomeric mixture of α, α', α''-tris(hydroxyphenyl)-1,3,5-trialkylbenzenes may be recovered by diluting the reaction mixture with a solvent such as chloroform or toluene followed by vacuum distillation of hydrogen chloride, water, unreacted phenolic reactant and solvent. The para isomer can be obtained by recrystallization as described above.

In preferred operation, α, α', α''-tris(hydroxyphenyl)-1,3,5-trialkylbenzenes are produced by a process which comprises intimately admixing a phenolic compound of the formula:

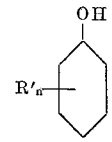

wherein R' is an alkyl radical having 1 to 5 carbon atoms and $n$ is an integer from 0 to 2, and a 1,3,5-trisubstituted benzene compound selected from the group consisting of 1,3,5-trialkenylbenzenes represented by the formula:

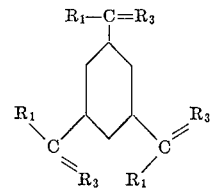

wherein $R_1$ is selected from the group consisting of hydrogen and alkyl radicals having 1 to 2 carbon atoms and $R_3$ is selected from the group consisting of $CH_2$ and $CH-CH_3$ radicals and α, α', α''-trihydroxy-1,3,5-trialkylbenzenes which are represented by the formula:

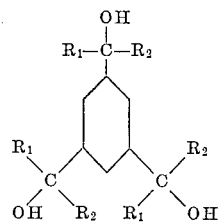

wherein $R_1$ and $R_2$ are the same or different and are selected from the group consisting of hydrogen and alkyl radicals having 1 to 2 carbon atoms, in a mol ratio of from about 8 to 25 mols phenolic compound per mol 1,3,5-trisubstituted benzene compound, at temperature of from about 40° to 90° C., saturating the resulting reaction mixture with anhydrous hydrogen chloride as catalyst and thereafter recovering the resulting α, α', α''-tris(hydroxyphenyl)-1,3,5-trialkylbenzenes from the reaction mixture.

If desired, tri- or hexa- chlorinated derivatives of the α, α', α''-tris(hydroxyphenyl)-1,3,5-trialkylbenzenes may be readily secured employing conventional processes. For example, a typical process comprises dissolving a α,α',α''-tris(hydroxyphenyl)-1,3,5-trialkylbeneze in an aqueous alkaline solution such as sodium, potassium or lithium hydroxide having a concentration of about 1 to 4 percent by weight and thereafter adding a suitable chlorinating agent such as sodium or potassium hypochlorite, chlorine gas, etc. Complete reaction and minimum contamination are insured by maintaining the resulting reaction mixture at temperature of about 25° to 50° C. under mild agitation. In order to secure a hexa derivative under the above recited reaction conditions about 6 mols of chlorinating agent as active chlorine per mol α,α',α''-tris(hydroxyphenyl)-1,3,5-trialkylbenzene are employed. A mol ratio less than 6 mols of chlorinating agent as active chlorine per mol α,α',α''-tris(hydroxyphenyl)-1,3,5-trialkylbenzene gives rise to a reaction mixture containing a significant amount of the trichloro substituted α,α',α''-(hydroxyphenyl)-1,3,5-trialkylbenzene. A mol ratio in excess of 6:1 results in unconsumed chlorinating agent and may, in some instances, produce chlorination other than that of the phenolic moiety. The trichloro derivatives of α,α',α''-tris(hydroxyphenyl)-1,3,5-trialkylbenzenes may be secured by employing about 3 mols chlorinating agent as active chlorine per mol α,α',α''-tris(hydroxyphenyl)-1,3,5-trialkylbenzenes. A mol ratio less than 3:1 is insufficient to produce significant yields of the trichloro derivatives while a mol ratio in excess of 3:1 tends to produce some hexachloro derivative.

The following examples are given for the purpose of illustration of the preparation of $\alpha,\alpha',\alpha''$-tris(hydroxyphenyl)-1,3,5-trialkylbenzenes. In the examples, parts are by weight.

EXAMPLE 1

A reaction vessel was equipped with a mechanical stirrer, gas inlet tube, heated dropping funnel, reflux condenser, thermometer and heating mantle. Into this reaction vessel was charged 1000 parts of phenol followed by heating until a temperature of 65° C. was attained. The molten phenol was then saturated with gaseous hydrogen chloride. A solution of 252 parts of $\alpha,\alpha',\alpha''$-trihydroxy-1,3,5-triisoproplybenzene in 500 parts of phenol was slowly added from the heated dropping funnel over a period of 3 hours. During this addition the reaction mixture was vigorously agitated while the reaction temperature was maintained between 60° and 65° C. Upon complete addition of the $\alpha,\alpha',\alpha''$-trihydroxy-1,3,5-triisopropylbenzene solution, the mixture was agitated for an additional 2 hours. At the end of this period the reaction mixture was allowed to cool and stand at room temperature for a period of 16 hours. Isolation of crude $\alpha,\alpha',\alpha''$-tris-(hydroxyphenyl)-1,3,5-triisopropylbenzene was effected by addition of 750 parts of chloroform followed by washing with 500 parts of water and then 500 parts of a 5 percent by weight aqueous solution of sodium bicarbonate solution to neutralize any remaining hydrogen chloride. The reaction mixture was then subjected to vacuum distillation at pot temperatures below 150° C. whereupon chloroform, unreacted phenol and water were distilled overhead. Crude $\alpha,\alpha',\alpha''$-tris(hydroxyphenyl)-1,3,5-triisopropylbenzene consisting essentially of its ortho and para isomers was obtained in a yield of 99 percent of theoretical based upon the amount of $\alpha,\alpha',\alpha''$-trihydroxy-1,3,5-triisopropylbenzene charged. The para isomer of the crude $\alpha,\alpha',\alpha''$-tris(hydroxyphenyl)-1,3,5-triisopropylbenzene was isolated by dissolving the crude product in a minimum of hot toluene followed by heating with decolorizing carbon and filtration. The resulting filtrate containing the isomers of $\alpha,\alpha',\alpha''$ - tris(hydroxyphenyl)-1,3,5-triisopropylbenzene was cooled to effect precipitation of the para isomer, and the solidified para isomer was separated by filtration. After recrystallization from toluene there was obtained 316 parts of the para isomer having a melting point of 187.5–189.5° C.

EXAMPLE 2

705 parts of phenol was charged to a reaction vessel and melted at a temperature of 52° C. The molten phenol was then saturated with anhydrous gaseous hydrogen chloride and thereafter 458 parts of $\alpha,\alpha',\alpha''$-trihydroxy-1,3,5-triisopropylbenzene were slowly added over a period of about six hours at a temperature in the range of about 35° to 45° C. Upon completion of this addition, the resulting reaction mixture was allowed to stand at room temperature for 16 hours. At the end of this period unreacted phenol was removed by water extraction, i.e. agitation with water, followed by heating at a temperature 90° to 95° C., followed by decanting of the aqueous phase. This extraction procedure was repeated seven times. The final extract was allowed to cool whereupon crude $\alpha,\alpha',\alpha''$-tris(hydroxyphenyl)-1,3,5-triisopropylbenzene solidified. After a 1:1 warm water wash the crude $\alpha,\alpha',\alpha''$ - tris(hydroxyphenyl) - 1,3,5-triisopropylbenzene was dissolved in 1,2-dichloroethane, heated and allowed to crystallize upon cooling. 114 parts of $\alpha,\alpha',\alpha''$-tris(4-hydroxyphenyl)-1,3,5-triisopropylbenzene having a melting point of 189° to 190° C. were recovered.

EXAMPLE 3

To the reaction vessel of Example 1 were charged 153.2 parts of phenol followed by addition of hydrogen chloride over a 40 minute period until saturation of the reaction mixture was effected, the temperature of the reaction mixture being maintained at 53° to 59° C. 25 parts of $\alpha,\alpha',\alpha''$-trihydroxy-1,3,5,-triisopropylbenzene were added to the reaction mixture over a seven minute period while the temperature was maintained at 55° to 63° C. Additional anhydrous hydrogen chloride was bubbled into the mixture for a period of one hour under agitation while the temperature was maintained at 53° to 58° C. The resulting reaction mixture containing crude $\alpha,\alpha',\alpha''$ - tris(hydroxyphenyl) - 1,3,5-triisopropylbenzene was then extracted three times with 1000 parts of warm water to remove excess phenol and heated to a temperature of 80° C., whereupon 43.4 parts of $\alpha,\alpha',\alpha''$-tris(hydroxyphenyl)-1,3,5-triisopropylbenzene having a melting point of 148° to 151° C. was isolated by filtration. Purification was effected by recrystallization from toluene resulting in a product which was primarily the para isomer and which had a melting point of 178° to 181° C.

Carbon-hydrogen analysis of the product indicated 82.5 percent carbon and 7.5 percent hydrogen as compared to the theoretical values of 82.2 percent carbon and 7.6 percent hydrogen.

EXAMPLE 4

Into the reaction vessel of Example 1 were charged 24.6 parts of $\alpha,\alpha',\alpha''$-trihydroxy-1,3,5-triethylbenzene and 94 parts of phenol. The resulting reaction mixture was then saturated with anhydrous hydrogen chloride at a temperature of about 50° to 60° C. The reaction was exothermic in nature and the reaction temperature immediately rose to 80° C. and was so maintained for a period of 21 hours. The temperature was then increased to 90° C. for an additional six hours. Isolation of crude $\alpha,\alpha',\alpha''$-tris(hydroxyphenyl)-1,3,5-triethylbenzene was effected by pouring the reaction mixture into 1700 parts of water and heating to temperature of 95° C. with stirring. The resulting solution was allowed to cool and the aqueous extract decanted. This procedure was repeated three times. The crude $\alpha,\alpha',\alpha''$-tris(hydroxyphenyl)-1,3,5-triethylbenzene was filtered and dried at 50° C. to yield 41.9 parts of product which corresponded to a yield of 81.6 percent of theory.

Chemical analysis showed phenolic hydroxy radical to be present in an amount of 11.4 percent by weight which is in excellent agreement to the theoretical value of 11.6 percent by weight. Infrared spectra showed conjugated ring C=C, hydroxyl group and 1,3,5-substitution all of which confirm the theoretical chemical structure.

The following example illustrates large-scale preparation of $\alpha,\alpha',\alpha''$-tris(hydroxyphenyl) - 1,3,5 - triisopropylbenzene.

EXAMPLE 5

5000 parts of phenol were charged into a reaction vessel equipped with a mechanical stirrer, gas inlet tube heated dropping funnel, reflux condenser, thermometer and heating mantle. Anhydrous hydrogen chloride was bubbled into the molten phenol maintained at temperature of 50° C. over a period of 1 hour. A molten solution consisting of 1260 parts of $\alpha,\alpha',\alpha''$-trihydroxy-1,3,5-triisopropylbenzene dissolved in 2500 parts of phenol was slowly added to the reaction mixture over a period of 1 hour from the heated dropping funnel. The temperature of the reaction mixture was maintained between 50° and 60° C. After the addition of this solution the reaction mixture was maintained at a temperature of 60° C. for an additional 0.25 to 1 hour under constant agitation and continuous addition of hydrogen chloride. At the end of this period 2400 parts of toluene were added to the reaction mixture followed by vacuum distillation to remove excess phenol, toluene, water and hydrogen chloride. Vacuum distillation was discontinued at pot temperature of 170° to 180° C. at 3 mm. Hg pressure. Upon cooling, 2370 parts of crude $\alpha,\alpha',\alpha''$-tris(hydroxyphenyl)-1,3,5-triisopropylbenzene crystallized into a brown solid having a melting point of about 150° to 160° C. This yield corresponded to 99.6 percent of theory based upon the α,α',α'' - trihydroxy - 1,3,5 - triisopropylbenzene charged. The crude product was then dissolved in acetone and solid impurities removed by filtration. 8000 parts of toluene were added to the product-acetone solution followed by strip distillation of the acetone. The reaction mixture was then cooled whereupon 1493 parts of a solid product crystallized out and were recovered by filtration. This product consisted primarily of the para isomer of α,α',α'' - tris(hydroxyphenyl) - 1,3,5-triisopropylbenzene and had a melting point of 175° C.

EXAMPLE 6

To a reaction vessel was charged 100 parts phenol followed by saturation with anhydrous hydrogen chloride at a temperature of 55° C. 19.8 parts of 1,3,5-triisopropenylbenzene dissolved in 45 parts of phenol were added over a 0.5 hour period. The temperature of the reaction mixture immediately increase to about 65° C. Additional anhydrous hydrogen chloride was added for another 0.5 hour period followed by mixing at 65° C. for a period of 4 hours and then 18 hours at room temperature. α,α',α'' - tris(hydroxyphenyl) - 1,3,5 - triisopropylbenzene precipitated out as a solid mass; this was dissolved in chloroform. The resulting solution was then washed with about a 15 percent by weight aqueous sodium carbonate solution followed by two washings with water. 44 parts of α,α',α''-tris(hydroxyphenyl)-1,3,5-triisopropylbenzene were isolated by distilling off the chloroform and excess phenol. This corresponded to a yield of 91.5 percent of theory. Recrystallization from ethylene dichloride yielded the para isomer of α,α',α''-tris(hydroxyphenyl)1,3,5-triisopropylbenzene as a solid material having a melting point of 183° to 186° C.

EXAMPLE 7

A reaction mixture comprised of 141.2 parts of phenol and 50 parts of an 18 percent by weight aqueous hydrochloric acid solution was prepared and heated to 65° C. under vigorous agitation. 25.2 parts of α,α',α''-trihydroxy-1,3,5-triisopropylbenzene were slowly added with agitation over a period of 40 minutes, the temperature being maintained at 63° to 65° C. The resulting reaction mixture was heated at this temperature for an additional 5.5 hours with agitation after which it was allowed to cool and stand for 19 hours at room temperature. The aqueous phase of the reaction mixture was removed and about 200 parts of chloroform were added followed by successive washing with water until the water washings exhibited a pH of about 7. Chloroform and unreacted phenol were removed by distillation and 53 parts of α,α',α''-tris(hydroxyphenyl)-1,3,5-triisopropylbenzene were obtained. Recrystallization from ethylene dichloride yielded 25 parts of α,α',α''-tris(hydroxyphenyl)-1,3,5-trisopropylbenzene which was predominantly the para isomer and had a melting point of 178° to 180° C.

The following example is given for the purpose of illustrating chlorination of α,α',α''-tris(hydroxyphenyl)-1,3,5-triisopropylbenzene.

EXAMPLE 8

10 parts of substantially pure α,α',α''-tris(p-hydroxyphenyl)-1,3,5-triisopropylbenzene were dissolved in 100 parts of a 3 perecent by weight aqueous sodium hydroxide solution. To the resulting solution was added dropwise 200 parts of a 5 percent by weight aqueous sodium hypochlorite solution over a period of one hour at a temperature of about 30° C. The reaction mixture was agitated for an additional one hour followed by neutralization effected by the addition of solid sodium bisulfite. Solid α,α',α'' - tris(4 - hydroxy - 3,5 - dichlorophenyl)-1,3,5-triisopropylbenzene having a melting point of 70° C. separated from the reaction mixture and was recovered by filtration, purified by washing with water and dried. Elemental analysis showed 57.5 percent carbon, 4.5 percent hydrogen, 7.5 percent phenolic hydroxy group and 29.9 percent chlorine which is in excellent agreement with the theoretical values of 57.6 percent carbon, 4.4 percent hydrogen, 7.5 percent phenolic hydroxy group and 30.2 percent chlorine.

EXAMPLE 9

A copper reaction vessel was equipped with a copper mixer, reflux condenser and a thermometer. To this reaction vessel was added about 155 parts of molten phenol and about 19 parts of an aqueous solution of hydrofluoric acid in a concentration of about 38 percent by weight. The resulting reaction mixture was heated to a temperature of 50° C. whereupon 25.2 parts of α,α',α''-trihydroxy-1,3,5-triisopropylbenzene were slowly added followed by heating at a temperature of 62° C. for a period of 5.5 hours under constant agitation. The resulting reaction mixture was then poured over crushed ice and neutralized with solid sodium carbonate. Sodium fluoride was removed from the reaction mixture by filtration and the filtrate was diluted with 2500 parts of water followed by extraction with chloroform. The resulting extract containing crude α,α',α''-tris(hydroxyphenyl) - 1,3,5 - triisopropylbenzene and excess phenol was evaporated to dryness using a film evaporator. 35 parts of crude α,α',α''-tris(hydroxyphenyl)-1,3,5-triisopropylbenzene were isolated by removal of excess phenol by vacuum distillation. This recovery corresponded to a theoretical yield of 73 percent based upon the amount of α,α',α''-trihydroxy-1,3,5-triisopropylbenzene charged. A purified product containing primarily the para isomer of α,α'α'' - tris(hydroxyphenyl)-1,3,5-triisopropylbenzene and having a melting point of 174° to 181° C. was obtained by crystallization from trichloroethylene.

EXAMPLE 10

972 parts of phenol, 80 parts of toluene and 50 parts of acid-activated bentonite-type clay (Filtrol No. 1) were charged into a reaction vessel equipped with a Dean-Stark trap, a reflux condenser, a thermometer and a mechanical stirrer. The mixture was heated to reflux and water removed from the system until the clay was rendered anhydrous. The mixture was then cooled to 60° C. and 252 parts of α,α',α''-trihydroxy-1,3,5-triisopropylbenzene were added. The reaction mixture was then refluxed for a period of nine hours after which time it was cooled to 80° C. and the clay removed by filtration. The filtrate was distilled to remove toluene and phenol leaving solid product. This product was identified to be a mixture of the ortho and para isomers of α,α',α''-tris(hydroxyphenyl)-1,3,5-triisopropylbenzene by infrared and —OH analysis and represented a yield of 71.2%.

EXAMPLE 11

972 parts of o-cresol are charged into a reaction flask equipped with a mechanical stirrer, gas inlet tube, reflux condenser and thermometer. The o-cresol is heated to 65° C. and is saturated with anhydrous hydrogen chloride. 252 parts of α,α',α''-trihydroxy-1,3,5-triisopropylbenzene are added in 3 equal portions at 1 hour intervals while maintaining the reaction mixture at 65° C. The reaction mixture is maintained at this temperature for an additional 10 hours. The reaction mixture is dissolved in 1500 parts of chloroform and washed free of any trace of acid with water. Chloroform and excess o-cresol are removed from the reaction mixture by distillation and solid α,α'α''-tris(4-hydroxy-3-methylphenyl) - 1,3,5 - triisopropylbenzene product is obtained upon cooling.

The α,α',α''-tris(hydroxyphenyl)-1,3,5-trialkylbenzenes may be converted to the corresponding epoxide resins by reaction with epichlorohydrin in the presence of an alkali and water.

The usefulness and structure of the resulting epoxide resin may be characterized by employing "epoxide equivalent" values. Epoxide equivalent is defined as the weight in grams of resin containing a 1 gram equivalent of epoxide groups. The epoxide equivalent is determined by ventional composition containing Bisphenol A epoxide and curing agent an amount of the epoxide of the invention equal in weight to the Bisphenol A epoxide.

The cured $\alpha,\alpha',\alpha''$-tris(hydroxyphenyl)-1,3,5-trialkylbenzene epoxide resins exhibit outstanding heat distortion temperatures and also possess excellent dimensional stability.

The following examples are given to illustrate the preparation of these new $\alpha,\alpha',\alpha''$-tris(hydroxyphenyl)-1,3,5-trialkylbenzene epoxide resins. In the examples, parts are by weight.

EXAMPLE 12

A reaction mixture comprised of 24 parts of $\alpha,\alpha',\alpha''$-tris(p - hydroxyphenyl) - 1,3,5-triisopropylbenzene, 41.6 parts of epichlorohydrin and 0.8 part of water was placed in a reaction pot fitted with a mechanical stirrer and reflux condenser, and heated at 95° C. for one-half hour under a nitrogen atmosphere. 6.6 parts of sodium hydroxide were then added in four equal increments over a one hour period while maintaining the reaction mixture at a temperature between 90° to 100° C. The reaction mixture was heated for an additional half hour at a temperature of 100° C. The reaction mixture was filtered and the filtrate vacuum distilled in order to remove excess epichlorohydrin and water. The resulting $\alpha,\alpha',\alpha''$ - tris(p-hydroxyphenyl) - 1,3,5-triisopropylbenzene epoxide resin was purified by dissolving in a toluene solution and refiltered. The filtrate was vacuum distilled to remove the toluene, giving 94% yield of epoxide resin of $\alpha,\alpha',\alpha''$-tris(p - hydroxyphenyl) - 1,3,5 - triisopropylbenzene having an epoxide equivalent of 289 and being devoid of hydrolyzable chlorine.

EXAMPLE 13

A reaction mixture comprised of 96 parts of $\alpha,\alpha',\alpha''$-tris(p - hydroxyphenyl) - 1,3,5 - triisopropylbenzene, 462.5 parts of epichlorohydrin, and 2.96 parts of water was placed in a reaction pot fitted with a mechanical stirrer and a reflux condenser, and heated at a temperature of 95° C. for a period of one hour. 26.4 parts of sodium hydroxide were added in 4 equal increments at fifteen minute intervals while maintaining the reaction mixture at a temperature of 95° C. The reaction mixture was cooled to room temperature water washed and filtered. The filtrate was vacuum distilled to remove the excess epichlorohydrin and water. The resulting $\alpha,\alpha',\alpha''$ - tris(p-hydroxyphenyl) - 1,3,5-triisopropylbenzene epoxide resin was dissolved in toluene and filtered in order to effect purification. This filtrate was vacuum distilled to remove the toluene yielding 127.5 parts of epoxide resin having an epoxide equivalent of 253 and no hydrolyzable chlorine content.

EXAMPLE 14

A reaction mixture comprised of 96 parts of $\alpha,\alpha',\alpha''$-tris(p - hydroxyphenyl) - 1,3,5 - triisopropylbenzene, 647.5 parts of epichlorohydrin, and 2.9 parts of $H_2O$ was placed in a reaction pot fitted with a mechanical stirrer and reflux condenser and heated at a temperature of 95° C. for a 1 hour period under nitrogen atmosphere. 26.4 parts of sodium hydroxide were added in 4 equal increments at 15 minute intervals while maintaining the reaction mixture at a temperature of 95° C. The reaction mixture was cooled to room temperature and filtered. The filtrate was then vacuum distilled to remove water and epichlorohydrin. The resulting $\alpha,\alpha',\alpha''$ - tris(p - hydroxyphenyl) - 1,3,5-triisopropylbenzene epoxide resin was dissolved in toluene and filtered to effect purification. The filtrate was vacuum distilled to remove the toluene, yielding 125.7 parts of $\alpha,\alpha',\alpha''$ - tris(p - hydroxyphenyl) - 1,3,5-triisopropylbenzene epoxide resin having an epoxide equivalent of 267 and a hydrolyzable chlorine content of 0.16%.

EXAMPLE 15

A reaction mixture comprised of 12 parts of $\alpha,\alpha',\alpha''$-tris(p - hydroxyphenyl) - 1,3,5 - triisopropylbenzene, and 2.3 parts of epichlorohydrin was heated to a temperature of 60° C. and 21.4 parts of 50% ethanol were added to effect homogeneous solution. The reaction mixture was then heated at a temperature of 60° C. for a period of one-half hour, followed by the addition of 1.1 parts of sodium hydroxide over a one-half hour period while maintaining the temperature of the reaction mixture at 60° C. After the addition of the sodium hydroxide, heating was continued for a period of 15 minutes. The reaction mixture was cooled to room temperature and formed a two layer system. A light brown solid was recovered from the lower layer after evaporation of excess alcohol and epichlorohydrin. This solid $\alpha,\alpha',\alpha''$ - tris(p-hydroxyphenyl)-1,3,5-triisopropylbenzene epoxide resin was dissolved in 18 parts of acetone. The resulting solution was filtered and the acetone removed by vacuum distillation. 12.3 parts of $\alpha,\alpha',\alpha''$ - tris(p - hydroxyphenyl) - 1,3,5 - triisopropylbenzene epoxy resin having an epoxide equivalent of 4,280 and a hydrolyzable chlorine content of 0.56% were obtained.

EXAMPLE 16

A reaction mixture comprised of 120 parts of an isomeric mixture of $\alpha,\alpha',\alpha''$ - tris(hydroxyphenyl) - 1,3,5-triisopropylbenzenes having a melting point of 148–151° C., 578.1 parts of epichlorohydrin and 3.7 parts of water was prepared and introduced into a reaction pot fitted with a mechanical stirrer and a reflux condenser, and heated at 95° C. for one hour under a nitrogen atmosphere. 33 parts of sodium hydroxide were added in four equal increments over a one hour period while the reaction mixture was maintained at a temperature of about 90 to 100° C. The reaction mixture containing crude $\alpha,\alpha',\alpha''$ - tris(hydroxyphenyl) - 1,3,5-triisopropylbenzene epoxide resin was filtered and the filtrate vacuum distilled to remove epichlorohydrin and water. The resulting product was purified by dissolving in toluene and filtering. The filtrate was vacuum distilled yielding 155 parts $\alpha,\alpha',\alpha''$ - tris(hydroxyphenyl)-1,3,5-triisopropylbenzene epoxy resin having an epoxide equivalent of 258 and a hydrolyzable chlorine content of 0.15%.

EXAMPLE 17

A reaction mixture comprised of 87.6 parts of $\alpha,\alpha',\alpha''$-tris(hydroxyphenyl)-1,3,5-triethylbenzene, 462.5 parts of epichlorohydrin and 2.96 parts of water is placed in a reaction pot fitted with a mechanical stirrer and a reflux condenser and heated at a temperature of 95° C. for a one hour period under nitrogen atmosphere. 26.4 parts of sodium hydroxide are then added in four equal increments at 15 minute intervals while maintaining the reaction mixture at a temperature of 95° C. The reaction mixture containing crude $\alpha,\alpha',\alpha''$-tris(hydroxyphenyl)-1,3,5-triethylbenzene epoxy resin is cooled to room temperature and filtered. The filtrate is then vacuum distilled to remove the water and epichlorohydrin. The resulting $\alpha,\alpha',\alpha''$ - tris(hydroxyphenyl) - 1,3,5 - triethylbenzene epoxy resin is dissolved in toluene and, once again, filtered. The filtrate in vacuum distilled to remove toluene, yielding $\alpha,\alpha',\alpha''$ - tris(hydroxyphenyl) - 1,3,5 - triethylbenzene epoxide resin having an epoxide equivalent of about 230.

EXAMPLE 18

A reaction mixture comprised of 136.8 parts of $\alpha,\alpha',\alpha''$-tris(4'-hydroxy-3',5'-dichlorophenyl) - 1,3,5-triisopropylbenzene, 462.5 parts of epichlorohydrin and 2.96 parts of water is placed in a reaction pot fitted with a mechanical stirrer and a reflux condenser, and heated at a temperature of 95° C. for a one hour period under a nitrogen atmosphere. 26.4 parts of sodium hydroxide are added in four equal increments at 15 minute intervals while maintaining the reaction mixture at a temperature of 95°

C. The reaction mixture is cooled to room temperature and filtered. The filtrate is vacuum distilled to remove the water and epichlorohydrin. The resulting crude α, α', α''-tris(4'-hydroxy-3',5'-dichlorophenyl)-1,3,5 - triisopropylbenzene epoxy resin is dissolved in toluene and filtered. The filtrated is vacuum distilled to remove the toluene, yielding an α, α', α''-tris(4'-hydroxy-3',5'-dichlorophenyl)-1,3,5-triisopropylbenzene epoxy resin having an epoxide equivalent of about 360.

EXAMPLE 19

Bars of cured resin were prepared using the epoxide resin of Example 14 which had been prepared from the para isomer of α, α', α''-tris(hydroxyphenyl)-1,3,5-triisopropylbenzene and the epoxide resin of Example 16 which had been prepared from an isomeric mixture of α, α', α''-tris(hydroxyphenyl)-1,3,5-triisopropylbenzene. The curing agent used was m-phenylene diamine which was added in equivalent amounts of 10.1 parts per 100 parts of the epoxide resin of Example 14, and 10.5 parts per 100 parts of the epoxide resin of Example 16. The cured resin bars were prepared by mixing the m-phenylene diamine curing agent with each of the resins at a temperature of about 70° C., pouring the resulting reaction mixture into molds, placing the molds in a vacuum oven at a temperature of 70° C. for one-half hour with the pressure reduced to the point where air bubbles did not cause resin to overflow from the molds, and thereafter, finally placing the molds in an oven at a temperature of 150° C. at atmospheric pressure for a period of 6 hours. The properties of the cured α, α', α''-tris(hydroxyphenyl)-1,3,5-trialkylbenzene epoxide resins are contained in Table I, set forth below.

TABLE I

| Property | Epoxide resin of Example 14 | Epoxide resin of Example 16 | Test method |
|---|---|---|---|
| Epoxide Equivalent, before curing | 267 | 258 | (Supra) |
| Tensile strength p.s.i. | 10,222 | 8,741 | ASTM 638 |
| Ultimate elongation, percent | 6.1 | 3.9 | ASTM 638 |
| Modulus, p.s.i. | 225,519 | 223,299 | ASTM 638 |
| Flexural strength, p.s.i. | 16,033 | 19,968 | ASTM D790 |
| Flexural modulus, p.s.i. | 413,000 | 526,316 | ASTM D790 |
| Compression yield, p.s.i. | 17,758 | 19,000 | ASTM D695 |
| Compression strength, p.s.i. | 23,493 | 27,700 | ASTM D695 |
| Izod impact inch pounds | 0.38 | 0.37 | ASTM 256 |
| Rockwell hardness, M-scale | 125 | 112 | ASTM D785 |
| Heat distortion temperature, 264 p.s.i., ° C. | 156 | 145 | ASTM D648 |

EXAMPLE 21

Adhesives were formulated from epoxide resins of Examples 14 and 16 by mixing 100 parts by weight of each of the resins with 40 parts by weight of aluminum powder and an equivalent amount of m-phenylene diamine (10.1 parts and 10.5 parts, respectively). The adhesives were then sandwiched between a ½ inch×1 inch overlap of sand blasted 1 inch×4½ inches×⅛ inch aluminum strips and the assemblies cured for 6 hours at 150° C. under contract pressure. The results are summarized in Table II, set forth below.

TABLE II

| Epoxide resin | Bond thickness, mils | Tensile Shear, p.s.i. | Test method |
|---|---|---|---|
| Example 14 | 10-12 | 1,600-1,800 | ASTM D1002 |
| Example 16 | 10-12 | 1,400 | ASTM D1002 |

The following examples are given for the purpose of further illustrating the preparation of cured insoluble, infusible epoxide resin of the present invention utilizing several of the aforementioned curing agents.

Three test samples of the epoxide resin derived from α, α', α''-tris(hydroxyphenyl)-1,3,5 - triisopropylbenzene were prepared substantially in accordance with the procedure set forth in example 12 and were found to possess the following chemical and physical properties contained in Table III.

TABLE III

| Property | Epoxide resin A | Epoxide resin B | Epoxide resin C |
|---|---|---|---|
| Epoxide equivalent | 336 | 1,235 | 830 |
| Molecular wt | 1,008 | 3,705 | 2,490 |
| Softening temperature, ° C | 64 | 95 | 94 |
| Esterification equivalent | 139 | 198 | 190 |
| Ash content, p.p.m | 200 | 500 | 200 |

The above expoxide resins A, B and C were mixed with dehydrated castor fatty acid in an amount of 60% by weight epoxide resin and 40% by weight dehydrated castor fatty acid at a temperature from about 250° C. to about 260° C. for a period of from about 2 to 3.25 hours. The resulting epoxide esters were then tested to determine their physical and chemical properties and the results are contained in Table IV, set forth below.

TABLE IV

| Property | Test Method | Epoxide Resin A | Epoxide Resin B I | Epoxide Resin B II[1] | Epoxide Resin C |
|---|---|---|---|---|---|
| Viscosity | (4) | D¾ | G½ | N.D. | Q− |
| Color, Gardner | (4) | 3+ | 12 | [3] N.D. | 4 |
| Acid value | ASTM D-1980 | 3.7 | 8.9 | 20 | 5.6 |
| Clarity | (5) | Clear | [2] N.D. | [3] N.D. | Clear |
| Non-volatile matter, percent by weight | (4) | 50 | 50 | 50 | 50 |

[1] Purified resin obtained by dissolving in xylene, filtering and finally isolated by distilling off the solvent. Sample contained an ash content of 12 p.p.m.
[2] N.D.—Not determined.
[3] Sample gelled.
[4] Determined in accordance to test procedures set forth in Gardner and Sward's "Physical and Chemical Examination of Paints, Varnishes, Lacquers and Colors," 11th Edition, Gardner Laboratory, Bethesda, Md.
[5] Visual observation.

Epoxide resins "A" and "C" set forth above in Table IV were then air-dried into hard solids utilizing cobalt naphthenate (0.04% by weight of cobalt based upon the amount of epoxide resin), and retested, the results of which are set forth below in Table V.

TABLE V

| Property [1] | Resin "A" | Resin "C" |
|---|---|---|
| Coating stability (G–H viscosity): | | |
| Initial | B | I½ |
| 48 Hours | B | K¼ |
| 1 week | B¼ | M |
| 7 weeks | B¾ | M¼ |
| Drying: | | |
| Set to touch | ½ hour | ½ hour |
| Tack free | 4 hours | 1½ hours |
| Color retention: | | |
| Initial | 6.15 | 6.80 |
| 72 hours, U.V | 7.40 | 8.80 |
| Flexibility, ⅛" mandrel: | | |
| Air-dry 7 days | No cracking | No cracking |
| Plus 144 hrs. 135° C | do | Do |
| Resistant properties: [2] | | |
| 2% NaOH(aq.)24 hours | No whitening | No whitening |
| Boiling water, 1 hour | Fine blistering | No blistering |
| Xylene: | | |
| 1 minute | No change | Slight lifting |
| 3 minutes | do | Lifting |
| 5 minutes | Softening | Softening |

[1] Determined in accordance with test procedures set by Gardner and Sward (supra).
[2] Tested on films air dried for a period of 7 days.

Epoxide resins "A" and "C," set forth in Table IV were also admixed with cobalt naphthenate (0.008% of cobalt, based on the total amount of epoxide resin) and air baked at a temperature of 180° C. for a period of 20 minutes. At the end of this period the resulting resins were retested and the data obtained are set forth below in Table VI.

TABLE VI

| Property [1] | Resin "A" | Resin "C" |
|---|---|---|
| Coating stability (G-H viscosity): | | |
| Initial | B | K. |
| 48 hours | B | K ½. |
| 1 week | B | K ¾. |
| 7 weeks | B+ | L. |
| Color retention: | | |
| Initial | 10.6 | 10.4. |
| 72 hours U.V. | 9.0 | 13.1. |
| Flexibility, ⅛" mandrel: | | |
| 180° C., 20 minutes | No cracking | No cracking. |
| Plus 72 hrs., 135° C | do | Do. |
| Resistant properties: | | |
| 2%NaOH (aq.) 24 hours | No change | No change. |
| Boiling water, 1 hour | do | Do. |
| Xylene, 5 days | Trace softening | Trace softening. |

[1] Pursuant to test procedures of Gardner and Sward (supra).

A polyamide resin curing agent was prepared by reacting 1 mole of linoleic acid dimer with 2 moles of ethylene diamine to give a polyamide having a amine value of 220 and a Brookfield viscosity of 500–700 poises at 40° C. and then dissolving the polyamide in sufficient xylene to give a solution containing 70% by weight of solids.

65 parts epoxide resins "A" and "C" were admixed with 35 parts of the polyamide resin solution. An 0.7–0.8 mil film of each product was applied to a bonderized steel panel by casting and cured by atmospheric exposure for 10 days. The physical properties of these cured epoxide resins are set forth in Table VII.

TABLE VII

| Properties [1] | Epoxide Resin "A" | Epoxide Resin "C" |
|---|---|---|
| Potlife, (G-H Viscosity): | | |
| Initial | G ½ | U ¾. |
| 8 hours | N | Y. |
| 12 hours | T | Z1. |
| 24 hours | Y ¼ | Z 5-¾ |
| 27 hours | Z 3¾ | Gelled. |
| 45 hours | Gelled | |
| Hardness, pencil: | | |
| 1 day cure | HB | HB. |
| 9 days cure | 2H | H. |
| Flexibility, ⅛" mandrel: | | |
| aged 7 days, R.T. | Passed | Passed. |
| 65 hrs. at 135° C | do | Failed. |
| 120 hrs. at 135° C | do | |
| Color retention: | | |
| Initial (cured 48 hrs.) | 5.5 | 5.7. |
| 72 hrs. U.V. | 7.6 | 8.4. |
| Resistant properties: | | |
| 10% NaOH (aq.) | | |
| 24 hrs | No change | No change. |
| 7 days | do | Do. |
| 8 days | do | Do. |
| 10% HCl (aq.): | | |
| 24 hrs | Pitting | No whitening. |
| 68 hrs.[1] | do | No pitting. |
| Boiling water 1 hour | No change | Slight softening. |

[1] Pursuant to test procedures of Gardner and Sward (supra).

Epoxide resin "B" was cured to thermoset condition by admixing with a urea formaldehyde resin. The ratio employed was 70% epoxide resin and 30% urea formaldehyde resin. This resin is commercially available from American Cyanamid Co. as Beetle 227-8 which is a solution of butylated urea-formaldehyde resin in a solvent which is a 60/40 mixture of butanol/xylene, said solution containing 50% by weight of solids and having a Gardner-Holdt viscosity of X–Z. The data were obtained by testing a film baked at 182° C. for a period of 20 minutes. These data are contained in Table VIII.

TABLE VIII

| Property [3] | Epoxide Resin "B" [1] |
|---|---|
| Film property, pencil hardness | 4H. |
| Resistance properties: | |
| Boiling 20% | |
| NaOH (aq.), 1 hr. | No blistering. |
| Recovery | Complete.[2] |
| Methyl Ethyl Ketone, 5 minutes | No change. |
| 10% HNO₃· | |
| 7 hours | No change. |
| 24 hours | |

[1] Ash content 12 p.p.m.
[2] When panel was removed from NaOH solution and cooled no change in original film could be observed.
[3] Pursuant to test procedures of Gardner and Sward (supra).

As is clearly shown from the above data the epoxide resins of the present invention may be cured into insoluble infusible material having outstanding dimensional and thermal stability, a high degree of chemical inertness and are readily processable.

It is to be understood that the foregoing is by way of illustration and that changes and modifications may be made within the scope of the appended claims without departing from the spirit of the invention.

We claim:

1. An epoxide resin comprising a reaction product of epichlorohydrin and at least one trisphenol of the formula:

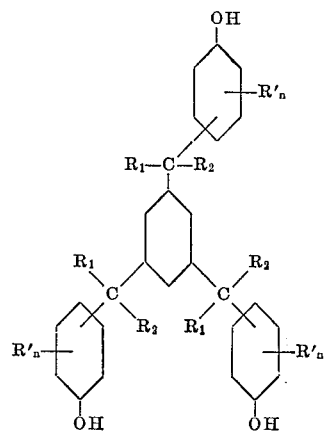

wherein $R_1$ and $R_2$ are independently selected from the group consisting of hydrogen, methyl and ethyl radicals, wherein R' is a $C_1$ to $C_5$ alkyl radical, and wherein $n$ is 1 or 2.

2. An epoxide resin in accordance with claim 1 wherein $R_1$ and $R_2$ are methyl.

3. An epoxide resin in accordance with claim 1 wherein $R_1$ is hydrogen and $R_2$ is methyl.

4. An epoxide resin in accordance with claim 1 wherein the trisphenol is α,α′,α″-tris(4-hydroxy-3-methylphenyl)-1,3,5-triisopropylbenzene.

5. A hard, infusible product obtained by curing the resin of claim 1.

6. A cured resin in accordance with claim 5 wherein said curing is effectuated by reaction of said resin with a curing agent selected from the group consisting of amines, polycarboxylic acids, polycarboxylic anhydrides, Friedel-Crafts metal halides, phosphoric acid esters, and inorganic acid metal salts.

7. A cured resin in accordance with claim 6 wherein said curing is effectuated by reaction of said resin with polycarboxylic acid.

8. A cured resin in accordance with claim 5 wherein said curing is effectuated by reaction of said resin with amine.

9. a cured resin in accordance with claim 5 wherein said curing is effectuated by reaction of said resin with Friedel-Crafts metal halide.

References Cited

UNITED STATES PATENTS

| | | | |
|---|---|---|---|
| 3,313,775 | 4/1967 | Fränkel | 260—348.6 X |
| 3,309,339 | 3/1967 | Barton et al. | 260—33.6 X |
| 3,281,478 | 10/1966 | Farnham | 260—348.6 X |
| 3,309,384 | 3/1967 | Shimp et al. | 260—348.6 |
| 3,301,818 | 1/1967 | Barton et al. | 260—348.6 X |
| 2,982,752 | 5/1961 | Phillips et al. | 260—47 X |
| 2,892,849 | 6/1959 | St. Clair | 260—348.6 |
| 2,801,989 | 8/1957 | Farnham | 260—47 |
| 3,376,259 | 4/1968 | Barton et al. | 260—18 X |
| 3,370,038 | 2/1968 | Barton et al. | 260—47 |

OTHER REFERENCES

Epoxy Resins: Lee-Neville, McGraw-Hill, New York, 1957 (pp. 30, 31, 284, 285).

DONALD E. CZAJA, Primary Examiner

C. W. IVY, Assistant Examiner

U.S. Cl. X.R.

260—18, 348.6, 831, 834